(12) United States Patent
Ma et al.

(10) Patent No.: US 10,866,464 B2
(45) Date of Patent: Dec. 15, 2020

(54) LIQUID CRYSTAL DISPLAY PANEL AND ELECTRONIC DEVICE

(71) Applicant: WUHAN CHINA STAR OPTOELECTRONICS TECHNOLOGY CO., LTD., Wuhan (CN)

(72) Inventors: Guizhi Ma, Wuhan (CN); Fang Gong, Wuhan (CN)

(*) Notice: Subject to any disclaimer, the term of this patent is extended or adjusted under 35 U.S.C. 154(b) by 0 days.

(21) Appl. No.: 16/496,437

(22) PCT Filed: May 17, 2019

(86) PCT No.: PCT/CN2019/087336
§ 371 (c)(1),
(2) Date: Sep. 22, 2019

(87) PCT Pub. No.: WO2020/211138
PCT Pub. Date: Oct. 22, 2020

(65) Prior Publication Data
US 2020/0333650 A1    Oct. 22, 2020

(30) Foreign Application Priority Data
Apr. 17, 2019 (CN) .......................... 2019 1 0307655

(51) Int. Cl.
G02F 1/1339  (2006.01)
G02F 1/1335  (2006.01)

(52) U.S. Cl.
CPC .... G02F 1/13394 (2013.01); G02F 1/133514 (2013.01); *G02F 2203/30* (2013.01)

(58) Field of Classification Search
CPC ............... G02F 1/1339; G02F 1/13394; G02F 1/133512; G02F 1/133514
See application file for complete search history.

(56) References Cited

U.S. PATENT DOCUMENTS

| | | | |
|---|---|---|---|
| 10,334,148 B2* | 6/2019 | Kwak | H04N 5/66 |
| 2007/0002265 A1 | 1/2007 | Kwak et al. | |
| 2012/0206669 A1* | 8/2012 | Kim | G02F 1/1339 349/58 |
| 2012/0327325 A1* | 12/2012 | Park | G06F 1/1686 349/58 |
| 2017/0075174 A1* | 3/2017 | Lee | G02F 1/133512 |
| 2020/0142231 A1* | 5/2020 | No | G02F 1/1368 |

FOREIGN PATENT DOCUMENTS

| CN | 1892382 A | 1/2007 |
|---|---|---|
| CN | 109100891 A | 12/2018 |
| CN | 109307962 A | 2/2019 |

* cited by examiner

*Primary Examiner* — Dung T Nguyen

(57) ABSTRACT

A blind via hole region of a liquid crystal display panel is provided with a transparent support section, such that a cell thickness of the liquid crystal display panel from a display region to the blind via hole region is uniform, thereby prevents a Newton ring structure from affecting the imaging of a camera positioned below the blind via hole.

14 Claims, 2 Drawing Sheets

LIQUID CRYSTAL DISPLAY PANEL AND ELECTRONIC DEVICE

FIELD OF INVENTION

The present application relates to the field of display technology, and in particular, to a liquid crystal display panel and an electronic device.

BACKGROUND OF INVENTION

A display ratio of display devices has developed from 16:9 to 18:9, and the screen of the display device has developed to a profiled screen and further a screen with a notch. An in-plane drilling technique has been developed to increase the screen ratio of the display device. Because the in-plane drilling has great challenges in process and yield of the display device, such that the in-plane blind via hole design has become a development trend.

An in-plane blind via hole design of the display device places a mobile phone camera below the blind via hole. For an in-plane switch (IPS) type liquid crystal display device or a fringing field switch (FFS) type liquid crystal display device, the blind via holes penetrate the glass of the array substrate and all the layers except the buffer layer on the glass, the blind via holes also penetrate the color film layer of the color filter substrate and the black matrix. An edge of the blind via hole is provided with a spacer to support an array substrate and a color filter substrate, and the blind via hole region of the display device has only the liquid crystal layer as a filling layer. Because liquid crystals of the liquid crystal layer is in a flowing state, the array substrate and the color filter substrate in the blind via hole region will have a concave in the middle portion under an effect of atmospheric pressure, thereby a minimum spacing between the array substrate and the color filter substrate is in the blind via hole region. The Newton's ring structure in the blind via hole area will form an equal inclination interference phenomenon, and the phenomenon will interfere with the mobile phone camera below the blind via hole.

Therefore, it is necessary to propose a technical solution to solve the problem that the imaging of a camera below a blind via hole is interfered with due to an appearance of a Newton ring structure of a liquid crystal display device.

Technical Problem

A purpose of the application is to provide a liquid crystal display panel and an electronic device. The uniformity of the cell thickness from the blind via hole region to the display region of the liquid crystal display panel is good, and the Newton ring structure is avoided, such that the imaging of the camera in the electronic device is not affected by the Newton ring structure.

TECHNICAL SOLUTION

The technical solution adopted by the present invention is as follows:

A liquid crystal display panel, including a blind via hole region and a display region positioned outside the blind via hole region, wherein the display region is provided with a plurality of pixel units arranged in an array, and the blind via hole region is provided with a transparent support section.

In the liquid crystal display panel, the transparent support section includes a plurality of transparent spacers, and the transparent spacers are arranged in an array in the blind via hole region.

In the liquid crystal display panel, the transparent spacers are arranged in an annular array around a center point of the blind via hole region to form a plurality of support rings, the support rings are arranged in a direction from the center point of the blind via hole region toward an edge of the blind via hole region.

In the liquid crystal display panel, a radius of each of the support rings near the center point of the blind via hole region is equal to a sum of lengths of three to four pixel units of the pixel units, a spacing between any two adjacent support rings is equal to a sum of the lengths of three to four pixel units of the pixel units.

In the liquid crystal display panel, a straight-line distance between any two adjacent transparent spacers among the support rings is equal to a sum of lengths of three to five pixel units of the pixel units.

In the liquid crystal display panel, a refractive index of material of the transparent support section ranges between 1.2 and 1.7.

In the liquid crystal display panel, the display region is provided with a plurality of sub-spacers and a height of each of the sub-spacers is less than a height of the transparent support section.

In the liquid crystal display panel, materials of the sub-spacers and the transparent support section are both a photoresist.

In the liquid crystal display panel, the sub-spacers and the transparent support section are formed by exposing the photoresist using a same half gray-scale mask and by developing using a developing solution.

In the liquid crystal display panel, the blind via hole region has a buffer layer and a protective layer, and the transparent support section is positioned between the buffer layer and the protective layer of the blind via hole region.

An electronic device, including a liquid crystal display panel and a camera, wherein the liquid crystal display panel has a blind via hole region and a display region positioned outside the via hole region, the display region is provided with a plurality of pixel units arranged in an array, the blind via region is provided with a transparent support section, and the camera is positioned on a back surface of a light emitting surface of the liquid crystal display panel and corresponds to the blind via hole region.

In the electronic device, the transparent support section includes a plurality of transparent spacers, and the transparent spacers are arranged in an array in the blind via hole region.

In the electronic device, the transparent spacers are arranged in an annular array around a center point of the blind via hole region to form a plurality of support rings, the support rings are arranged in a direction from the center point of the blind via hole region toward an edge of the blind via hole region.

In the electronic device, a radius of each of the support rings near the center point of the blind via hole region is equal to a sum of lengths of three to four pixel units of the pixel units, a spacing between any two adjacent support rings is equal to a sum of the lengths of three to four pixel units of the pixel units.

In the electronic device, a straight-line distance between any two adjacent transparent spacers among the support rings is equal to a sum of lengths of three to five pixel units of the pixel units.

In the electronic device, a refractive index of material of the transparent support section ranges between 1.2 and 1.7.

In the electronic device, the display region is provided with a plurality of sub-spacers and a height of each of the sub-spacer is less than a height of the transparent support section.

In the electronic device, materials of the sub-spacers and the transparent support section are both a photoresist.

In the electronic device, the sub-spacers and the transparent support section are formed by exposing the photoresist using the same half gray-scale mask and by developing using a developing solution.

In the electronic device, the blind via hole region has a buffer layer and a protective layer, and the transparent support section is positioned between the buffer layer and the protective layer of the blind via hole region.

Beneficial Effect

The present application provides a liquid crystal display panel and an electronic device. A blind via hole region of the liquid crystal display panel is provided with transparent support section, the cell thickness of the liquid crystal display panel from the display region to the blind via hole region is uniform, thereby prevents the Newton ring structure from affecting the imaging of the camera positioned below the blind via hole.

DESCRIPTION OF DRAWINGS

In order to more clearly illustrate the technical solutions in the embodiments of the present invention, the following figures described in the embodiments will be briefly introduced. It is obvious that the drawings described below are merely some embodiments of the present invention, other drawings can also be obtained by the person ordinary skilled in the art based on these drawings without doing any creative activity.

DETAILED DESCRIPTION OF PREFERRED EMBODIMENTS

The technical solutions in the embodiments of the present application will be clearly and completely described in the following with reference to the accompanying drawings in the embodiments. It is obvious that the described embodiments are only a part of the embodiments of the present application, and not all of them. All other embodiments obtained by a person skilled in the art based on the embodiments of the present application without creative efforts are within the scope of the present application.

Figure 1:
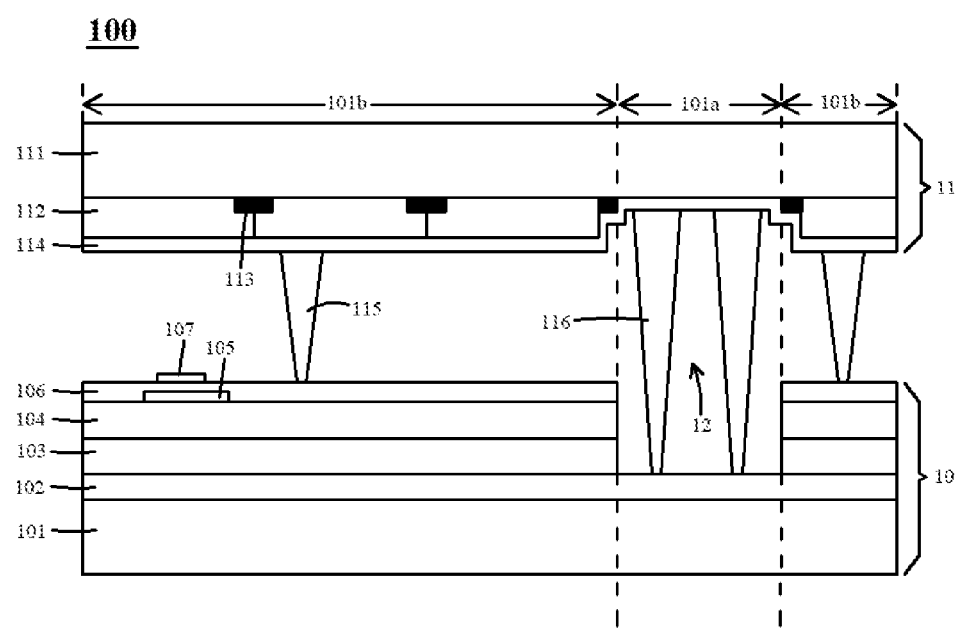
FIG. 1 is a schematic diagram of a liquid crystal display panel according to an embodiment of the present application.

Please refer to FIG. 1, which is a schematic diagram of a liquid crystal display panel according to an embodiment of the present application. The liquid crystal display panel 100 is an in-plane switch type liquid crystal display panel or a fringing field switch type liquid crystal display panel. The liquid crystal display panel 100 includes an array substrate 10, a color filter substrate 11, and a blind via hole 12.

The array substrate 10 includes a first substrate 101 having a blind via hole region 101a and a display region 101b positioned outside the blind via hole region 101a. A buffer layer 102 is formed on the blind via hole region 101a and the display region 101b of the first substrate 101. A thin film transistor layer 103 is disposed on a side of the buffer layer 102 of the display region 101b away from the first substrate 101.

A planarization layer 104 is disposed on a side of the thin film transistor layer 103 of the display region 101b away from the first substrate 101. A first transparent electrode 105 is disposed on the planarization layer 104 of the display region 101b. A passivation layer 106 is disposed on the first transparent electrode 105 and the planarization layer 104 of the display region 101b. A second transparent electrode 107 is disposed on a side of the passivation layer 106 away from the first substrate 101. One of the first transparent electrode 105 and the second transparent electrode 107 is a common electrode, and the other is a pixel electrode.

The color filter substrate 11 includes a second substrate 111, the second substrate 111 is disposed opposite to the first substrate 101. A blind via hole region and a display region are correspondingly disposed on the second substrate 111. The blind via hole region on the color filter substrate 11 coincides with the blind via hole region 101a on the array substrate, the display region on the color filter substrate 11 coincides with the display region 101b on the array substrate. A color film layer 112 and a black matrix layer 113 are disposed on the second substrate 111 of the display region 101b. The color film layer 112 includes a red photoresist, a green photoresist, and a blue photoresist. The color film layer 112 has a thickness of 1.5 micrometers to 2 micrometers. The black matrix layer 113 is disposed between adjacent two color photoresists to function to shield light leakage from a backlight outside the pixel region. The black matrix layer 113 has a thickness of 1.2 micrometers to 1.5 micrometers. The color film layer 112 of the display region 101b and the second substrate 111 of the blind via hole region 101a are covered with a protective layer 114. The protective layer 114 functions to make a surface of the color filter substrate 11 flatter and protect the color film layer 112. The protective layer 114 has a thickness of 0.8 micrometers to 1.2 micrometers. The material of the protective layer 114 is a transparent resin.

A sub-spacer 115 is disposed on the protective layer 114 of the display region 101b. A transparent support section is disposed on the protective layer 114 of the blind via hole region 101a. When the color filter substrate 11 and the array substrate 10 are bonded into a cell to form a liquid crystal display panel, the sub-spacers 115 are used to support the array substrate 10 and the color filter substrate 11 of the display region 101b. The transparent support section is used for supporting the array substrate 10 and the color filter substrate 11 of the blind via hole region 101a. A height of each of the sub-spacers 115 is less than a height of the transparent support section. The height of the sub-spacers 115 is 2 micrometers to 4 micrometers, and the height of the transparent support section is 7 micrometers to 9 micrometers. The material of the sub-spacers 115 and the transparent support section are photoresist. The sub-spacer 115 is columnar. The sub-spacer 115 and the transparent supporting section are formed in a process for manufacturing the color filter substrate 11 and are formed by exposing the photoresist with a same half gray-scale mask and by developing using a developing solution. It can be understood that the sub-spacer 115 and the transparent support section can also be formed in two steps. The refractive index of the material for preparing the transparent support section is 1.2-1.7 such that the refractive index of the transparent support section is close to that of the buffer layer 102, the second substrate 111 and the first substrate 101 of the blind via hole region 101a. Therefore, total reflection of light in the blind via hole region 101a is prevented, and the transmittance of light in the blind via hole region 101a is improved.

The first transparent electrode 105, the second transparent electrode 107, the liquid crystal (not shown), and the color film layer of the display region 101b constitute a plurality of pixel units arranged in an array, that is, the display region is provided with a plurality of pixel units arranged in an array. Each pixel unit is square, and each square pixel unit has equal length and width of 60 micrometers to 90 micrometers. Each pixel unit includes one red sub-pixel, one green sub-pixel, and one blue sub-pixel.

The blind via hole 12 is positioned in the blind via hole region 101a. The blind via hole region 101a is circular or other shapes. The application describes the blind via hole 12 as a circle. The blind via holes 12 penetrate all the layers of the array substrate 10 except the buffer layer 102, and the blind via holes 12 also penetrate the color film layer 112 and the black matrix layer 113 on the color filter substrate 11. The transparent support section of the blind via hole region 101a is positioned between the protective layer 114 of the color filter substrate 11 of the blind via hole region 101a and the buffer layer 102 of the array substrate 10. That is, the blind via hole region 101a has a buffer layer and a protective layer, and the transparent support section is positioned between the buffer layer 102 and the protective layer 114 of the blind via hole region 101a.

Figure 2:
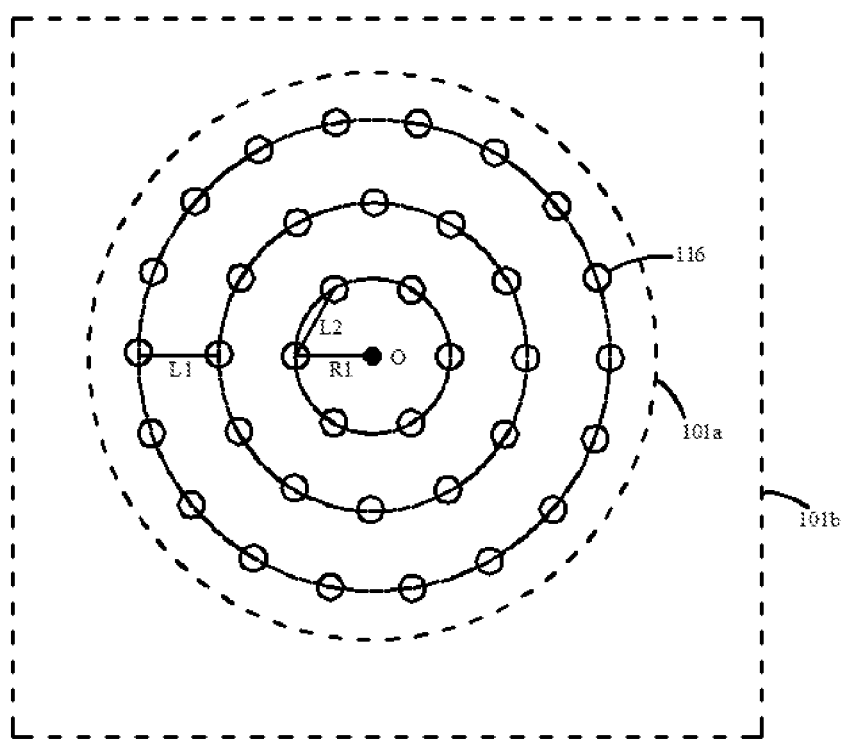
FIG. 2 is a plan diagram of a transparent support portion of the liquid crystal display panel shown in FIG. 1.

Please refer to FIG. 2, which is a top view of the transparent support section of the liquid crystal display panel shown in FIG. 1. The transparent support section includes a plurality of transparent spacers 116, and the transparent spacers 116 are arranged in an array in the blind via hole region 101a. The transparent spacer 116 is columnar. Specifically, a plurality of transparent spacers 116 are arranged around a center point O of the blind via hole region 101a to form a plurality of support rings, and the support rings are arranged in a direction from the center point O of the blind via hole region 101a toward an edge of the blind via hole region 101a. The transparent spacers 116 are arranged in an annular array such that the transparent spacer 116 can support the array substrate 10 and the color filter substrate 11 of the blind via hole region 101a. At the same time, the gap between any two transparent spacers 116 and the gap between any two support rings further improve the transmittance of light in the blind via hole region 101a.

A radius R1 of each of the support rings near the center point O of the blind via hole region 101a is equal to a sum of lengths of three to four pixel units of the pixel units, a spacing L1 between any two adjacent support rings is equal to a sum of the lengths of three to four pixel units of the pixel units. A straight-line distance L2 between any two adjacent transparent spacers 116 among the support rings is equal to a sum of lengths of three to five pixel units of the pixel units.

The liquid crystal display panel of the present application has a transparent support section in the blind via hole region so that the cell thickness from the blind via hole region to the display region of the liquid crystal display panel is uniform, such that a spacing between the array substrate and the color filter substrate in the blind via hole region to be smaller than a spacing between the array substrate and the color filter substrate in the display region and a formation of Newton ring structure are avoided. Therefore, the Newtonian ring structure is prevented from causing an optical interference phenomenon of light passing through the blind via hole region.

Figure 3:
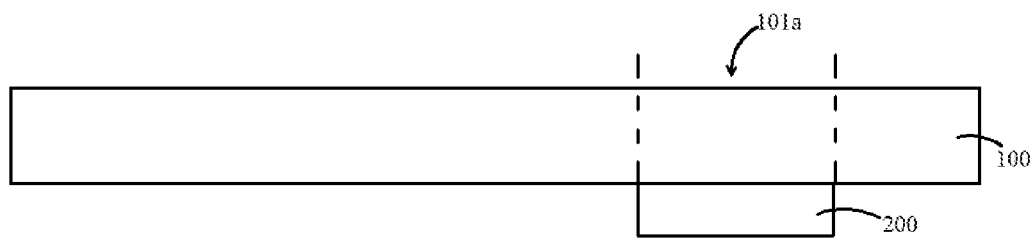
FIG. 3 is a schematic diagram of an electronic device according to an embodiment of the present application.

Please refer to FIG. 3, which is a schematic diagram of an electronic device according to an embodiment of the present application. The electronic device can be a smart mobile device, a tablet computer or a monitoring device, etc. The electronic device includes the liquid crystal display panel 100 and the camera 200. The camera 200 is positioned on a back surface of a light emitting surface of the liquid crystal display panel 100 and corresponds to the blind via hole region 101a.

The electronic device of the present application is provided with a transparent supporting section in the blind via hole region of the liquid crystal display panel, the cell thickness from the blind via hole region to the display region of the liquid crystal display panel is uniform, such that a spacing between the array substrate and the color filter substrate in the blind via hole region to be smaller than a spacing between the array substrate and the color filter substrate in the display region and a formation of Newton ring structure are avoided. Therefore, the imaging of the camera on a side of the blind via hole region is prevented from interfering with by the Newton ring structure.

The description of the above exemplary embodiments is only for the purpose of understanding the invention. It is to be understood that the present invention is not limited to the disclosed exemplary embodiments. It is obvious to those skilled in the art that the above exemplary embodiments may be modified without departing from the scope and spirit of the present invention.

What is claimed is:

1. A liquid crystal display panel, comprising a blind via hole region and a display region positioned outside the blind via hole region, wherein the display region is provided with a plurality of pixel units arranged in an array, and the blind via hole region is provided with a transparent support section, the transparent support section comprises a plurality of transparent spacers, the plurality of transparent spacers are arranged in an annular array around a center point of the blind via hole region to form a plurality of support rings, the plurality of support rings are arranged in a direction from the center point of the blind via hole region toward an edge of the blind via hole region.

2. The liquid crystal display panel according to claim 1, wherein a radius of each of the support rings near the center point of the blind via hole region is equal to a sum of lengths of three to four pixel units of the pixel units, a spacing between any two adjacent support rings is equal to a sum of the lengths of three to four pixel units of the pixel units.

3. The liquid crystal display panel according to claim 1, wherein a straight-line distance between any two adjacent transparent spacers among the support rings is equal to a sum of lengths of three to five pixel units of the pixel units.

4. The liquid crystal display panel according to claim 1, wherein a refractive index of material of the transparent support section ranges between 1.2 and 1.7.

5. The liquid crystal display panel according to claim 1, wherein the display region is provided with a plurality of sub-spacers and a height of each of the sub-spacers is less than a height of the transparent support section.

6. The liquid crystal display panel according to claim 5, wherein materials of the sub-spacers and the transparent support section are both photoresists.

7. The liquid crystal display panel according to claim 1, wherein the blind via hole region has a buffer layer and a protective layer, and the transparent support section is positioned between the buffer layer and the protective layer of the blind via hole region.

8. An electronic device, comprising a liquid crystal display panel and a camera, wherein the liquid crystal display panel has a blind via hole region and a display region positioned outside the via hole region, the display region is provided with a plurality of pixel units arranged in an array, the blind via region is provided with a transparent support section, and the camera is positioned on a back surface of a light emitting surface of the liquid crystal display panel and corresponds to the blind via hole region, the transparent support section comprises a plurality of transparent spacers, the plurality of transparent spacers are arranged in an annular array around a center point of the blind via hole region to form a plurality of support rings, the plurality of support rings are arranged in a direction from the center point of the blind via hole region toward an edge of the blind via hole region.

9. The electronic device according to claim 8, wherein a radius of each of the support rings near the center point of the blind via hole region is equal to a sum of lengths of three to four pixel units of the pixel units, a spacing between any two adjacent support rings is equal to a sum of the lengths of three to four pixel units of the pixel units.

10. The electronic device according to claim 8, wherein, a straight-line distance between any two adjacent transparent spacers among the support rings is equal to a sum of lengths of three to five pixel units of the pixel units.

11. The electronic device according to claim 8, wherein a refractive index of material of the transparent support section ranges between 1.2 and 1.7.

12. The electronic device according to claim 8, wherein the display region is provided with a plurality of sub-spacers and a height of each of the sub-spacer is less than a height of the transparent support section.

13. The electronic device according to claim 12, wherein materials of the sub-spacers and the transparent support section are both a photoresist.

14. The electronic device according to claim 8, wherein the blind via hole region has a buffer layer and a protective layer, and the transparent support section is positioned between the buffer layer and the protective layer of the blind via hole region.

* * * * *